2 Sheets--Sheet 1.

J. F. QUIMBY.

Reservoir Cooking-Stoves.

No. 6,152.

Reissued Nov. 24, 1874.

Attest:

W. S. Coombs

James L. Norris,

Inventor.

Julius F. Quimby
By Amadeus Wilkinson
his Attorney

N. PETERS, PHOTO-LITHOGRAPHER, WASHINGTON, D. C.

J. F. QUIMBY.

Reservoir Cooking-Stoves.

No. 6,152. Reissued Nov. 24, 1874.

Inventor.

Attest:

Jos. S. Coombs

James L. Norris.

Julius F. Quimby,
By Amadus Wilkinson
His Attorney

N. PETERS, PHOTO-LITHOGRAPHER, WASHINGTON, D. C.

UNITED STATES PATENT OFFICE.

JULIUS F. QUIMBY, OF TROY, NEW YORK, ASSIGNOR, BY MESNE ASSIGNMENTS, TO JOSEPH B. WILKINSON, OF SAME PLACE.

IMPROVEMENT IN RESERVOIR COOKING-STOVES.

Specification forming part of Letters Patent No. 83,407, dated October 27, 1868; reissue No. 5,124, dated October 29, 1872; reissue No. 5,844, dated April 21, 1874; reissue No. 6,152, dated November 24, 1874; application filed October 31, 1874.

*To all whom it may concern:*

Be it known that I, JULIUS F. QUIMBY, of the city of Troy, county of Rensselaer, and State of New York, have invented certain new and useful Improvements in Water-Reservoir Cooking Stoves or Ranges; and I do hereby declare that the following is a full and exact description of the same, reference being had to the annexed drawing, and to letters of reference marked thereon, forming a part of this specification, in which—

Figure 1:
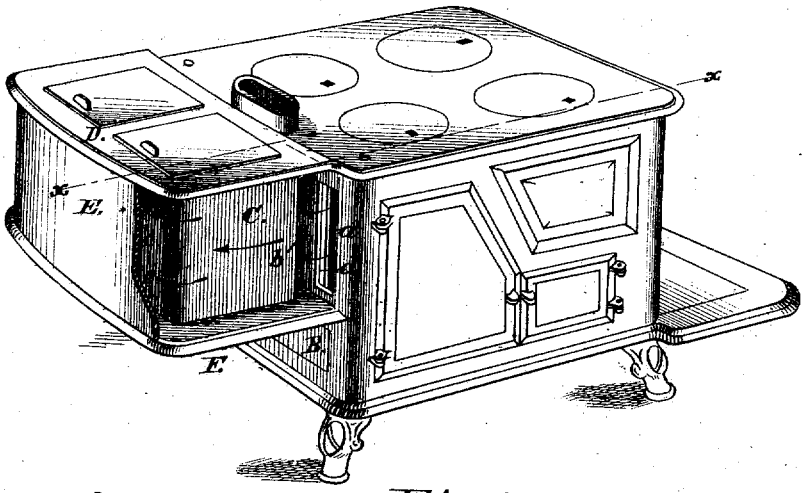
Figure 2:
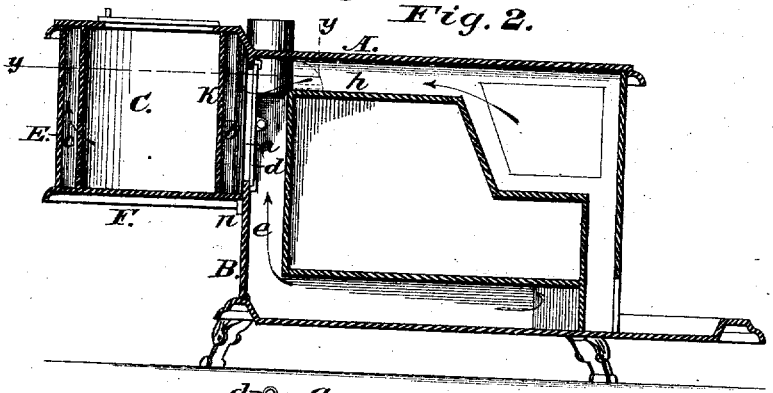
Figure 3:
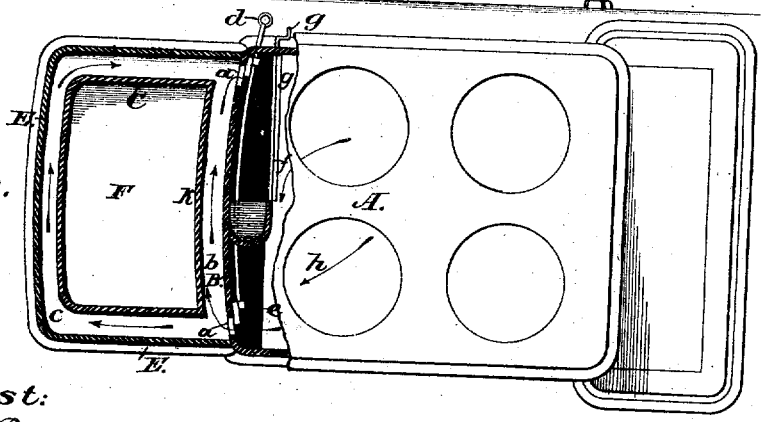
Figure 4:
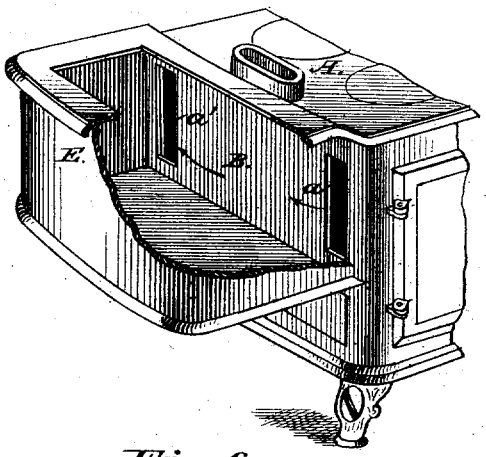
Figure 5:
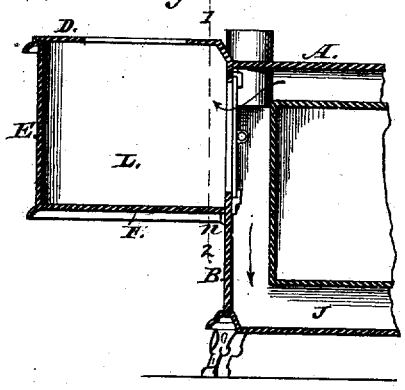
Figure 6:
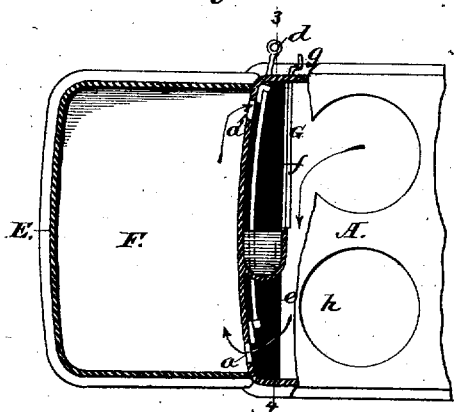
Figure 7:
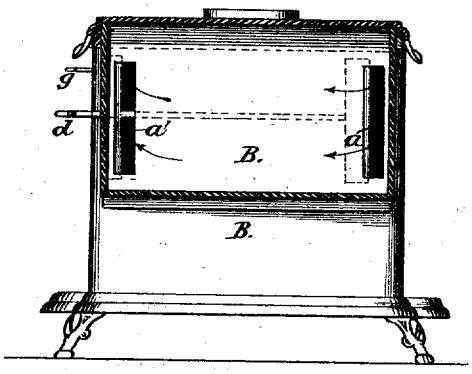
Figure 8:
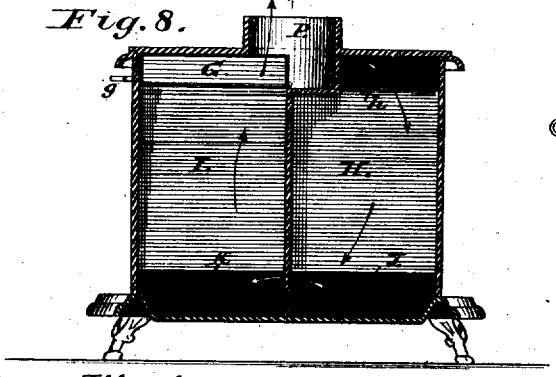
Figure 9:
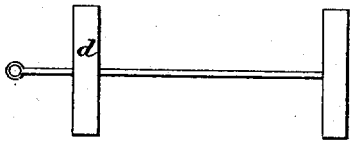

Figure 1 is a perspective view of a cooking-stove, and showing my improved water reservoir or tank attached thereto, and connected therewith by my improved manner of construction thereof. Fig. 2 is a vertical longitudinal sectional view taken at the dotted line *x x* of Fig. 1. Fig. 3 is a top or plan view of my improved water-reservoir cooking-stove, with the reservoir top plate and a part of the stove-top plate removed to show more clearly my said improvements therein. Fig. 4 is a perspective view of the reservoir-casing with the vertical walls of the reservoir removed, showing by the arrows the motion of the heat or products of combustion. Fig. 5 is a vertical section of the rear part of the stove, showing the case with the vertical walls of the reservoir removed. Fig. 6 is a top or plan view with reservoir removed. Fig. 7 is a view of the outside of the stove-back with the reservoir-casing removed, being a section through line 1 2, Fig. 5. Fig. 8 is a vertical section of the rear end of the stove with the back-plate and reservoir-casing removed, showing the top, rear, and bottom flues, taken through line 3 4 of Fig. 6. Fig. 9 is the damper that closes the openings through the back-plate, so as to shut off the heat from the reservoir. It consists in two flanges attached to a single damper-rod, and so arranged that they open or close simultaneously the apertures leading into the reservoir-chamber.

The same letters refer to like parts in each of the said figures.

My said invention relates to improvements in that class of cooking-stoves provided with a water-reservoir at the back, by means of which water can be heated in a reservoir so located with less fuel, and when heated can be kept so for a longer space of time than by any other stove before known.

To enable others skilled in the art to make and use my said invention, I now proceed to fully describe its construction and operation, to wit:

In the annexed drawings, A represents a cooking-stove of the usual form of construction, and with the addition thereto, as made in and through its exterior, rear, or end plate B, and at each side thereof, of the induction and exit apertures *a* and *a'*, respectively, in manner as substantially shown in Figs. 3 and 4. The hot-water reservoir C is constructed with a continuous flange or rim, D, projecting outward from its top edges at its front, back, and end sides. The bottom F of this reservoir likewise projects outward at and from its front and back and end sides, respectively. It has also a ridge or small flange, *l*, upon and near the edge of said projecting plate, that extends around the ends and rear thereof, to aid in holding the upright sides or jacket to said reservoir.

The casing is now complete, inclosing on all sides the reservoir C, which is secured to the respective top and bottom projecting rims D and F of said reservoir by rivets or bolts, or by other suitable means, and in such a manner as to form double end sides and rear side for said reservoir C, and inclosing a space or chamber between said walls or sides, which, being full of air, retards and prevents the cooling of water in said reservoir by retarding and preventing the radiation of heat therefrom by the non-conducting properties of air in said chamber, formed between the reservoir and outer casing, and the said chamber or space forms also a flue, *c*, which, being connected with the diving or descending flue of the cooking-stove A, in the manner as hereinafter described and shown, forms a branch flue therefrom, and which may divert a portion of the heat therefrom, which passes in a horizontal direction around the reservoir C, and inside of the outer case E in the flue *c*, substantially as shown in Figs. 1 and 3 of the annexed drawings, to thereby more rapidly heat the water in the tank C. This water-reservoir casing, as thus constructed, substantially, is now arranged at and attached by lugs or bolts, or by other suitable means, to the exterior wall or side B of a cooking stove or range, A, and in a manner such that the projecting top and bottom edges of the flanges or rims aforesaid, or the equivalent devices therefor, and the end side edges of the jacket or side casing E of said water-reservoir, may make a close joint with the exterior wall or rear side B of a cooking-stove, so as to thereby form a transverse flue, *b*, between water-reservoir C and the exterior wall B of the stove, which separates the flue *b* from the stove-flues *e* and *f*, or their equivalent flues, which are, by means of the induction and exit openings *a* and *a'* aforesaid, connected with the said reservoir-flue *c*, and the transverse flue *b* connects at each end with the end of the flue *c*, near the apertures *a* and *a'*, in manner substantially as shown in Fig. 3. The induction-opening *a* is provided with the damper *d*, with which to close it whenever desired, so as to send or divert all the hot products of combustion under and through the oven-flues. A damper, G, is arranged, in the usual manner, within the top flue of the stove, to shut off the direct draft to the exit-pipe when so desired, to thereby send the heat through the oven-flues, and also through the reservoir-flue *b*. The reservoir-top is provided with lids or covers, which are attached to the top rim D.

It will also be observed that the damper *d*, by means of its two flanges, opens and closes at the same time both the induction and the exit openings, so that when open a circulation of hot-air currents is obtained through the reservoir-chamber, and when closed a dead-air chamber is formed on all sides of the reservoir.

To operate this improved water-reservoir cooking-stove, close the direct-draft damper G, and open the water-reservoir flue-damper *d*. The heated gases or products of combustion now pass to the descending flue *e*; thence through the induction-opening *a* into the reservoir-flues *c* and *b*, circulating therein around and about the sides and ends of said water-reservoir C, in the manner about as shown by the arrows in the annexed drawings, and so as to heat quickly and effectively, and keep the water hot within said reservoir. The heated gases thence pass through the opening *a'* into the rising exit-flue *f*; thence into the exit-pipe, as shown. The amount of heat passing into said reservoir-flues is easily regulated by said damper *d*, by partially closing the opening *a* therewith, so as to graduate the temperature of the water in said reservoir, from warm to hot and hot to warm, as may be wanted, and, when no hot water is wanted, to entirely close the damper *d*, which thereby diverts all the heated gases through the oven-flues, and forms a dead-air chamber about the front, rear, and end sides of the reservoir.

This improved water-reservoir may be adapted and applied to "three-flued" and other varieties of flues in cooking-stoves, by shifting, if necessary, the location of the exit-opening *a'*, so as to always connect it with the rising exit-flue of the stove, and by shifting, if necessary, the induction-opening *a*, so as always to connect with the descending or diving flues thereof, thus shifting their positions, respectively, whenever necessary, to suit the particular arrangement of stove-flues in each case to which the improved water-reservoir may be applied.

The flange of the damper *d*, by the opening of which the products of combustion are forced into the reservoir-chamber, is placed in the diving flue opening *a*, though any equivalent producing the same result or movement of heat in front of the reservoir may be used.

It will be seen that when the damper *d* is opened, the products of combustion pass directly from the fire-box rearward into the descending flue or flues, and immediately thereafter turn inward into the reservoir-casing, and against the face or side of the reservoir, and pass to the rising or exit flue, thus heating the reservoir by direct draft in a manner wholly new with this improved reservoir.

It will be seen, also, by Figs. 4 and 6, that there must be an inlet and an outlet, an induction and an exit passage, for the products of combustion—the inlet-openings connected with the downward rear flues of the stove, while the outlet-opening is connected with the ascending rear flue of the stove.

It will be seen, also, that the top part of the reservoir and its casing or top rim D are raised above the top plate of the cooking-stove, so as to enlarge the reservoir by increasing its depth without occupying the space below the reservoir; and, again, it will be seen by Figs. 1 and 2 that the reservoir comes quite down to the plate F—that is, to the bottom of the casing—so as to still increase its capacity without encroaching upon the space below said plate F, which is needed for the usual hot-closet, or for other purposes. The hot products of combustion do not go under the reservoir, but rapidly and quickly in front of it by direct heat from the fire-box.

Heretofore reservoirs have been heated from below, or by the motion of the heat up and down the rear upright flues, passing around the oven at the same time, while in this invention the reservoir is not heated from the bottom, nor does the heat necessarily operate on the bottom of the oven while heating the reservoir.

The plate F is substantially horizontal, and entirely so as regards its outer ends and back edges. This leaves the space for the usual hot-closet unobstructed by a sink or flue space below the reservoir, which is not usual with other reservoirs. The covers to the reservoir are hung to the top rim D, which caps and holds the sides of the casing E, and also holds the top part of the reservoir C in its place, and connects and forms close joint with it.

It will be observed that the pipe-collar in front of the casing occupies its usual position over the rising rear flue of the stove, and that the hot products of combustion may enter into the casing, but they must return again before passing into the smoke-pipe.

The products of combustion are forced from the descending flue or flues into the casing by opening the damper or dampers which close the induction opening or openings leading from the descending flue or flues into the reservoir-casing. This creates an active flue in front of the reservoir. There is nothing to compel an active circulation within the casing around the ends and back of the reservoir, the caloric merely expanding in this flue *c*.

It will be seen that the size of this reservoir with reference to the size of the casing is not an essential point, as with previous cased reservoirs, because it is not necessary to the free and perfect operation of the stove that any flue-heat or flue-smoke pass through it. Thus the reservoir may be enlarged or diminished at will, which cannot be done with any other style of cased reservoir heretofore made without injuring the operation of the stove itself. This is regarded as a very valuable improvement, for the reason that, in order to secure a reservoir of proper size, when a flue passes through the inclosing-chamber, the chamber itself must be disproportionately larger and cumbersome; or, in other words, with such construction of casing the reservoir would not only have to be very small if the casing were not an overgrown incumbrance, but the water in it would be continually boiling away, and wasting itself in steam in the room, which would be both disagreeable and injurious. It is an essential point, therefore, that this casing is so constructed with reference to the flues of the stove that the reservoir may be enlarged to fill the casing, or diminished so as to only partially fill it, and yet no working quality of the stove would be altered, or even injured thereby, the only effect being the increasing or diminishing of the heat the reservoir would receive from the rear flues of the stove through the openings in front of it.

As before stated, very little, if any, heat—that is, active heat—will pass through the flue *c*. Practically, then, the space at each end and on the rear of the reservoir is simply a dead flue-space, the office or use of which being merely to hold and preserve the penetrating heat and gases of the active flues in front of the reservoir; but, as also above referred to, if it is desirable not to divert any of the products of combustion from the bottom oven-flues, and direct active currents impinging upon the reservoir are not necessary to heat the water contained therein to the desired temperature, the damper *d* may be closed and this result accomplished. The flanges then close the apertures leading from the rear flues to the reservoir-chamber, thus forming a dead-air chamber on all sides of the reservoir, which, not only preventing the radiation of heat from the reservoir, but, acting at the same time as a chamber to receive the caloric penetrating through the back plate from the rear flues, forms a desirable and gentle means of heating the water contained in the reservoir.

I am aware that a casing for a water-reservoir is not new in itself, having been invented by others; nor is it new to place a reservoir in rear of a cook-stove; therefore, neither feature is broadly claimed here.

Having thus fully described my invention, what I claim, and desire to secure by Letters Patent, is—

1. A casing for a water-reservoir, located on the rear end of a diving-flue cooking-stove, in combination with the exit-pipe of the stove, retaining its usual position over the ascending rear flue in front of said casing, substantially as set forth.

2. A casing for a water-reservoir, formed on the rear end of a diving-flue cooking-stove, and in rear of the exit-pipe and back-flues, and in combination therewith, a portion of the back of the stove being removed to admit heat or the products of combustion to traverse the ascending and descending flues, and the interior of the casing, substantially as set forth.

3. A casing for a water-reservoir, located on the rear end of a diving-flue cooking-stove, having its top portion elevated above the plane of the top plate of the stove, and in combination therewith, the bottom of the reservoir being below the top plate and in rear of the back flues, and in communication therewith, substantially as set forth.

4. A casing for a water-reservoir, located in the rear of a diving-flue cooking-stove, and in combination therewith, the said casing being provided with a top plate, elevated above the plane of the top plate of the stove, and connected therewith by a downwardly-projecting inclined flange or plate, substantially as described.

5. For a diving-flue cooking-stove, a reservoir and casing combined, the bottom of the reservoir and the bottom of the casing joining with each other for enlarging the space below said casing in rear of the stove.

6. A water tank or reservoir, situated in rear of a diving-flue cooking-stove, and in combination with the rear flues thereof, said rear flues being connected with each other by a damper or dampers, opening or openings, forming a transverse or cross flue in front of the reservoir, permitting the heat or heated products of combustion to pass from the descending flue or flues to the ascending flue, and thereby heating the reservoir in their passage, in the manner and for the purpose substantially as herein described and set forth.

7. A reservoir-casing, formed on the rear end and behind a diving-flue cooking-stove, and in combination therewith, inclosing a a space or chamber, which connects with the descending rear flue or flues of said stove, whereby the air or the reservoir contained therein may be heated by the products of combustion passing into or through said flues, substantially as set forth.

8. A reservoir-casing, formed in rear of a diving-flue cooking-stove, and in combination therewith, inclosing a space or chamber connected with the rear ascending flue of the stove by an opening, whereby the air of the reservoir contained in said chamber may be heated or receive heat from said flue as the products of combustion pass therein upward to the exit-opening, said opening being placed over and connected with said flue in the usual manner, substantially as set forth.

9. The water-reservoir, heated by direct draft from the fire-box, by means of a cross-flue formed in front of the reservoir, and in combination therewith, and in rear of the oven, by which the heated products of combustion are allowed to pass from the downward to the upward flue on the front or side of the reservoir, and in close contact therewith, as and for the purposes described.

10. A casing for a reservoir inclosed therein, and in combination therewith, situated in rear of a diving-flue cooking-stove, having its inclosing-chamber connected with rear flues, thereby permitting the products of combustion, in passing through said flues, to pass over, along, or against the inner front or side of the reservoir before they enter the exit-pipe, located over the ascending flue of the stove, as and for the purposes described.

11. In combination with an active flue in front of a reservoir situated within a casing in rear of a diving-flue cooking-stove, a confined or dead flue-space created on the ends and rear sides of the reservoir, for holding and containing the penetrating products of combustion which emerge from an active flue in front, and which may assist in heating the reservoir, substantially as set forth.

12. The combination of a horizontal plate, projecting from the rear plate of a diving-flue cooking-stove below the opening in said rear plate, with a water-reservoir, for the purpose of supporting the water-reservoir inclosed therein, substantially as set forth.

13. In combination with a water-reservoir, situated in rear of a diving-flue cooking-stove, a damper placed at the front of the reservoir and to the rear of the oven, by the opening of which the heat, smoke, or products of combustion are permitted to pass from the downward to the upward rear flue in front of and against the reservoir without passing under the bottom of the oven, and by the closing of which they are made or allowed to pass under the oven, as and for the purposes set forth.

14. In a diving-flue cooking-stove, the combination of a damper or dampers arranged in or on the back or rear casing thereof, with a reservoir-casing or flue-chamber located in the rear of the stove, said damper or dampers, when opened, permitting the currents of heat to pass through the casing or flue-chamber for heating a reservoir connected therewith, and, when closed, to drive the heat under the oven for heating the same, thus heating the reservoir without heating the bottom of the oven, and the bottom of the oven without heating the reservoir, substantially as set forth.

15. A reservoir-casing or flue-chamber, located in the rear of a diving-flue cooking-stove, having a dampered aperture or apertures from the descending flue or flues into said reservoir-casing or flue-chamber, in combination with an opening into the rear ascending flue, through which active currents of heat are allowed to pass from the descending flue or flues to the rear ascending flue, for the purpose of heating a water-reservoir connected therewith without heating the bottom of the oven, substantially as set forth.

16. In combination with the exit-pipe placed over the ordinary rear flue-space of a diving-flue cook-stove, between the oven and the reservoir, a downward and upward draft-flue, by means of which the products of combustion may be brought in contact with a water-reservoir, located behind the ordinary rear flue-space, and beyond the exterior rear wall of the stove, without passing under the oven, as and for the purposes set forth.

17. In a cooking-stove having a casing with a reservoir contained therein, located exterior to its rear wall, a dead-air chamber formed on all the sides of the reservoir, substantially in the manner and for the purposes set forth.

18. In a cooking-stove provided with an incased water-reservoir, located exterior to its rear wall, and having apertures connecting the rear flues with the hot-air chamber formed between the reservoir and the casing, a damper, in combination with the casing, said damper having two flanges attached to a single rod, and adapted to open or close simultaneously two of the said apertures, permitting the products of combustion to heat the reservoir by direct draft without passing under the oven, substantially as set forth.

JULIUS F. QUIMBY.

Witnesses:

ALMADUS WILKINSON,
CHAS. E. WILSON.